(12) United States Patent
Knuth

(10) Patent No.: US 8,430,122 B2
(45) Date of Patent: Apr. 30, 2013

(54) FLUID TANK WITH CONTAMINATION CONTAINMENT SYSTEM

(75) Inventor: Bruce E. Knuth, Oconomowoc, WI (US)

(73) Assignee: Helgesen Design Services, LLC, Hartford, WI (US)

( * ) Notice: Subject to any disclaimer, the term of this patent is extended or adjusted under 35 U.S.C. 154(b) by 771 days.

(21) Appl. No.: 12/549,473

(22) Filed: Aug. 28, 2009

(65) Prior Publication Data

US 2010/0051121 A1 Mar. 4, 2010

Related U.S. Application Data

(60) Provisional application No. 61/093,014, filed on Aug. 29, 2008.

(51) Int. Cl.
*B01D 21/00* (2006.01)
(52) U.S. Cl.
USPC .......................... 137/546; 137/563; 210/299
(58) Field of Classification Search ............... 137/563, 137/545, 546; 210/165.1, 294, 299, 304
See application file for complete search history.

(56) References Cited

U.S. PATENT DOCUMENTS

| | | | | | |
|---|---|---|---|---|---|
| 3,762,548 | A | * | 10/1973 | McCabe | 210/170.11 |
| 4,614,596 | A | * | 9/1986 | Wyness | 210/754 |
| 6,143,173 | A | * | 11/2000 | Luo et al. | 210/305 |
| 6,210,575 | B1 | * | 4/2001 | Chase et al. | 210/304 |
| 6,605,219 | B2 | * | 8/2003 | Lambert | 210/605 |
| 6,962,656 | B2 | * | 11/2005 | Davidian et al. | 210/172.2 |
| 2008/0289917 | A1 | * | 11/2008 | L'Aot et al. | 188/152 |

* cited by examiner

*Primary Examiner* — John Rivell
*Assistant Examiner* — Angelisa Hicks
(74) *Attorney, Agent, or Firm* — Reinhart Boerner Van Deuren P.C.

(57) ABSTRACT

A hydraulic storage tank is provided. The hydraulic storage tank includes a storage tank, a return flow filtration chamber, a contaminant containment chamber (CCC) and a tube connecting the return flow filtration chamber with the CCC. The storage tank defines a reservoir for storing hydraulic fluid. The return flow filtration chamber is configured to house a return flow filter. The CCC includes a boundary wall bounding a cavity and a CCC outlet fluidly communicating the cavity with the reservoir. The CCC outlet is radially inward from the boundary wall. The tube defines a discharge passage fluidly connecting the filtration chamber with the cavity of the CCC and includes an inlet in fluid communication with the filtration chamber and an outlet in fluid communication with the CCC. The outlet of the tube directs fluid in angular direction about an axis defined by the contaminant containment chamber outlet.

20 Claims, 4 Drawing Sheets

FLUID TANK WITH CONTAMINATION CONTAINMENT SYSTEM

CROSS-REFERENCE TO RELATED PATENT APPLICATIONS

This patent application claims the benefit of U.S. Provisional Patent Application No. 61/093,014, filed Aug. 29, 2008, the disclosure and teachings of which are incorporated herein, in their entireties, by reference.

FIELD OF THE INVENTION

This invention generally relates to hydraulic fluid storage tanks and particularly hydraulic fluid storage tanks for hydraulic fluid that is drawn from the tank, circulated through a hydraulic system and then deposited back into the storage tank.

BACKGROUND OF THE INVENTION

Typical hydraulic systems have a hydraulic reservoir (i.e. a hydraulic fluid storage tank) that stores excess hydraulic fluid that is used by the system. The hydraulic fluid is a working fluid that is typically used to drive hydraulic cylinders, pumps, hydraulic motors or other devices for performing desired operations. Typically, the hydraulic systems will include a hydraulic pump to pressurize the fluid as it passes through the system to provide adequate power to drive the devices of the system. Additionally, hydraulic systems typically reuse the hydraulic fluid such that the hydraulic fluid is drawn from the storage tank passed through the system and then deposited back into the storage tank where it is held until it is reused by the system again.

To prevent debris or impurities from repeatedly passing through the system, prior art storage tanks 10, such as illustrated in FIG. 1, typically include a return flow filter 12 that may be either internal to the tank (as shown) or external to the tank (not shown) that filters the return fluid (illustrated as arrows 14) prior to the fluid being mixed with the rest of the clean fluid 16 being stored in the fluid tank 10. Unfortunately, when a device within the system fails, debris created due to the failure of the failed component enters the hydraulic system and is transferred back to the storage tank 10.

To prevent the system from running dry of fluid or from creating a back pressure on the system, many systems include a bypass valve 17 (either within the filter 12 itself or the reservoir 18 in which the filter 12 is housed, as shown in FIG. 1) that allows fluid 20 to bypass the filter 12, or at least the filter media of the filter 12, when the return flow filter 12 becomes spent. Unfortunately, when the bypass valve 17 opens, this permits the large debris 21 from any component failure to pass into the clean fluid storage area 22 of the storage tank 10. This debris 21 then has the opportunity to reenter the hydraulic system, which can result in further damage to the hydraulic system.

To prevent this debris 21 from again passing through the system, the storage tank 12 typically includes a baffle 24 that impedes the debris from reaching fluid outlet 26 (also known as a suction port). Additionally, the fluid outlet 26 or suction port is typically protected by a strainer 28, which is basically a coarse screen. Unfortunately, the baffle plate 24 and strainer 28 can be expensive and when the strainer 28 becomes clogged, pumps within the hydraulic system begin to run dry from fluid or are not otherwise sufficiently supplied with fluid such that the pumps begin to cavitate or otherwise degrade.

The present invention relates to improvements over the current state of hydraulic storage tanks that incorporate a fluid bypass that allows fluid to bypass the return flow filter.

BRIEF SUMMARY OF THE INVENTION

The present invention provides a new and improved hydraulic fluid storage tank. More particularly, the present invention provides a new and improved hydraulic fluid storage tank that prevents the need of screen or filtration device proximate an outlet or suction port of the storage tank reservoir. Further yet, the present invention provides a new and improved hydraulic fluid storage tank that need not be entirely drained to clean contaminants that pass through a bypass valve in a return flow filtration assembly due to filter clogging.

In that respect, in one embodiment, a hydraulic storage tank is provided. The hydraulic storage tank includes a storage tank, a return flow filtration chamber, a contaminant containment chamber (CCC) and a tube connecting the return flow filtration chamber with the CCC. The storage tank defines a reservoir for storing hydraulic fluid. The return flow filtration chamber is configured to house a return flow filter. The CCC includes a boundary wall bounding a cavity and a CCC outlet fluidly communicating the cavity with the reservoir. The CCC outlet is radially inward from the boundary wall. The tube defines a discharge passage fluidly connecting the filtration chamber or other source of return fluid with the cavity of the CCC and includes an inlet in fluid communication with the filtration chamber and an outlet in fluid communication with the CCC. The outlet of the tube directs fluid in angular direction about an axis defined by the contaminant containment chamber outlet.

In a preferred embodiment, the discharge passage flows through the boundary wall of the CCC, rather than down through the outlet of the CCC. The outlet of the discharge passage is thus aligned non-radially such that the outlet flow of the discharge passage generates a swirling or angular motion of the fluid about a central axis defined by the outlet of the CCC. This motion causes heavier particulates to flow radially outward such that as the fluid flows through the CCC, the particulates are trapped within the CCC and prevented from the flowing back into the reservoir.

In a further embodiment, an entire hydraulic system is provided. The hydraulic system includes a storage tank, a return flow filtration chamber, a contaminant containment chamber (CCC), a tube connecting the return flow filtration chamber with the CCC and a pump. The storage tank defines a reservoir for storing hydraulic fluid. The return flow filtration chamber is configured to house a return flow filter. The CCC includes a boundary wall bounding a cavity and a CCC outlet fluidly communicating the cavity with the reservoir. The CCC outlet is radially inward from the boundary wall. The tube defines a discharge passage fluidly connecting the filtration chamber with the cavity of the CCC and includes an inlet in fluid communication with the filtration chamber and an outlet in fluid communication with the CCC. The outlet of the tube directs fluid in angular direction about an axis defined by the contaminant containment chamber outlet. The pump operably coupled to the storage tank circulates fluid through the system from the storage tank and back into the storage tank.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 2:
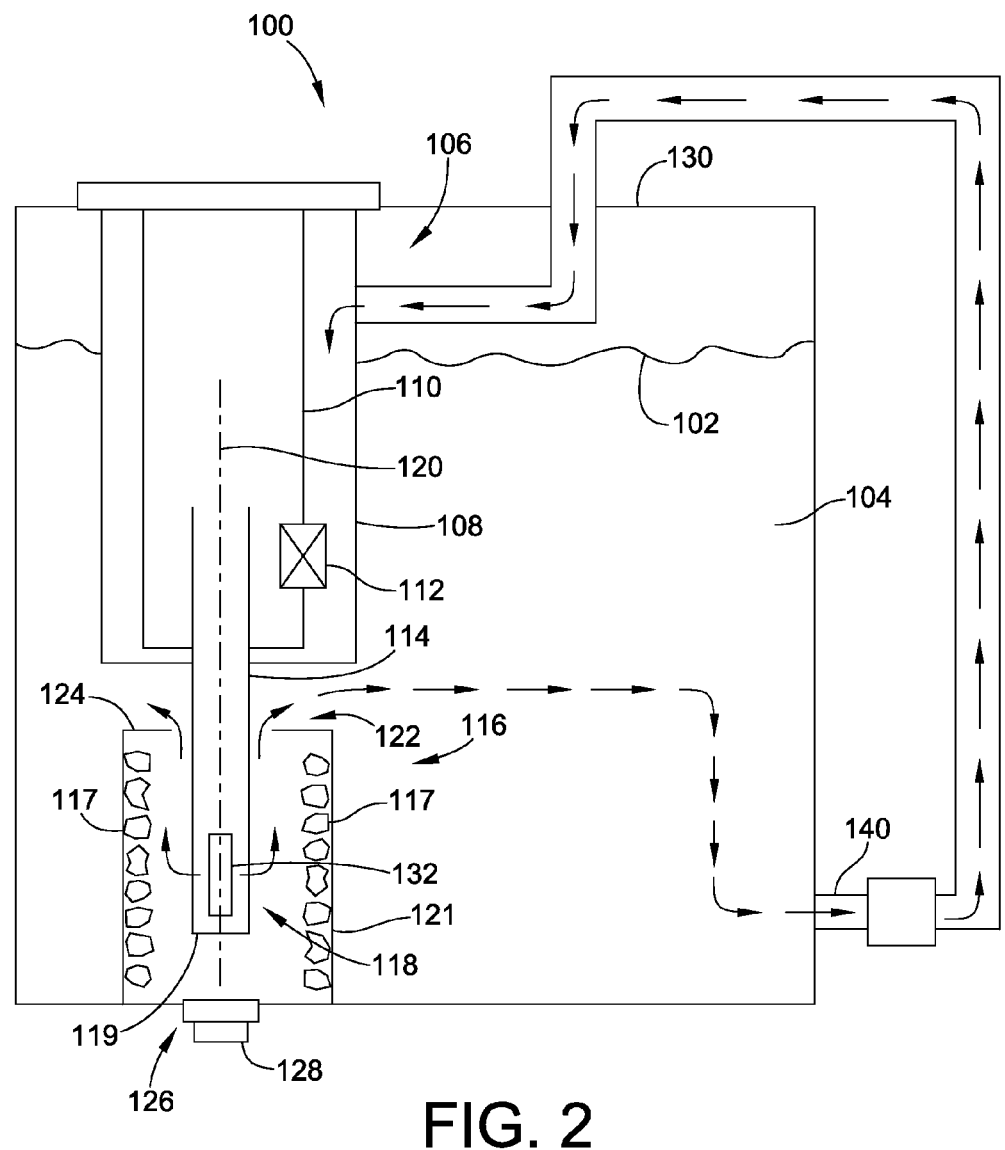
FIG. 2 is a simplified schematic representation of an embodiment of a hydraulic storage tank according to teachings of the present invention.

Turning now to FIG. 2, a simplified schematic representation of a hydraulic storage tank 100 according to the teachings of the present invention. The storage tank 100 stores hydraulic fluid 102 within reservoir 104 formed by the storage tank 100. The storage tank 100 forms part of a larger hydraulic system (not shown), which draws the hydraulic fluid from the storage tank 100, uses the fluid to power other devices, and then returns the fluid back to the storage tank 100.

The hydraulic storage tank 100 generally includes a return flow filter assembly 106. The return flow filter assembly 106 includes a filtration chamber 108 which is generally positioned within reservoir 104 that houses a return flow filter 110. The return flow filter assembly includes a bypass valve 112 that forms part of the return flow filter 110 that opens due to an increase in pressure within the filtration chamber 108 when the return flow filter 110 becomes clogged or spent. The bypass valve 112 could be located external to and form no part of the return flow filter 110.

The filtration chamber 108 further includes a discharge passage 114 that allows fluid to exit the filtration chamber 108. In the illustrated embodiment, fluid can only pass through the discharge passage 114 by passing through the return flow filter 110. However, this fluid may or may not be filtered depending on whether or not the fluid passes through the filter media of the return flow filter 110 (i.e. when the return flow filter 110 is not spent) or through the bypass valve 112 (i.e. when the return flow filter 110 is spent).

Unlike the prior art tank 10 described above, the discharge passage does not dispense the fluid directly into reservoir 104. Thus, any particulate that may pass through the bypass valve 112 upon component failure is not immediately dispensed into the reservoir 104, and the rest of the clean fluid 102, like the prior art tank 10.

Instead, according to an embodiment of the present invention, the discharge passage 114 dispenses into a contaminant containment chamber 116. This contaminant containment chamber 116 is configured to trap large particulate debris 117 prior to the fluid returning to reservoir 114.

The contaminant containment chamber 116 acts on centrifugal fluid motion to separate the large particulate debris 117 from the fluid. The discharge passage 114 includes an arrangement of one or more apertures that forms outlet 118 that is configured to direct the return fluid in a circular flow within contaminant containment chamber 116. In the illustrated embodiment, the return fluid is directed in a circular flow about an axis 120 defined by the centerline of discharge passage 114. More particularly, the fluid exits outlet 118 generally angularly relative to axis 120 and generally tangent to the circular cross-section of the tube/pipe forming discharge passage 114. It should be noted that the tube/pipe forming discharge passage 114 is generally closed at the end 119 that is positioned within contaminant containment chamber 116.

This circular motion causes the larger particulates to move to the outer portion of the circular flow and proximate annular boundary wall 121 of the contaminant containment chamber 116.

The contaminant containment chamber 116 includes an outlet 122 that is positioned radially inward of the annular boundary wall 121 such that only fluid free of the large particulates 117 is permitted to exit into reservoir 104. In the illustrated embodiment, outlet 122 is an aperture formed in a top wall 124 of the contaminant containment chamber 116 that is generally perpendicular to annular boundary wall 121. The outlet 122 has an inner diameter that is larger than an outer diameter of the pipe or tube that forms discharge passage 114 and the outlet circumscribes discharge passage 114.

Figure 1:
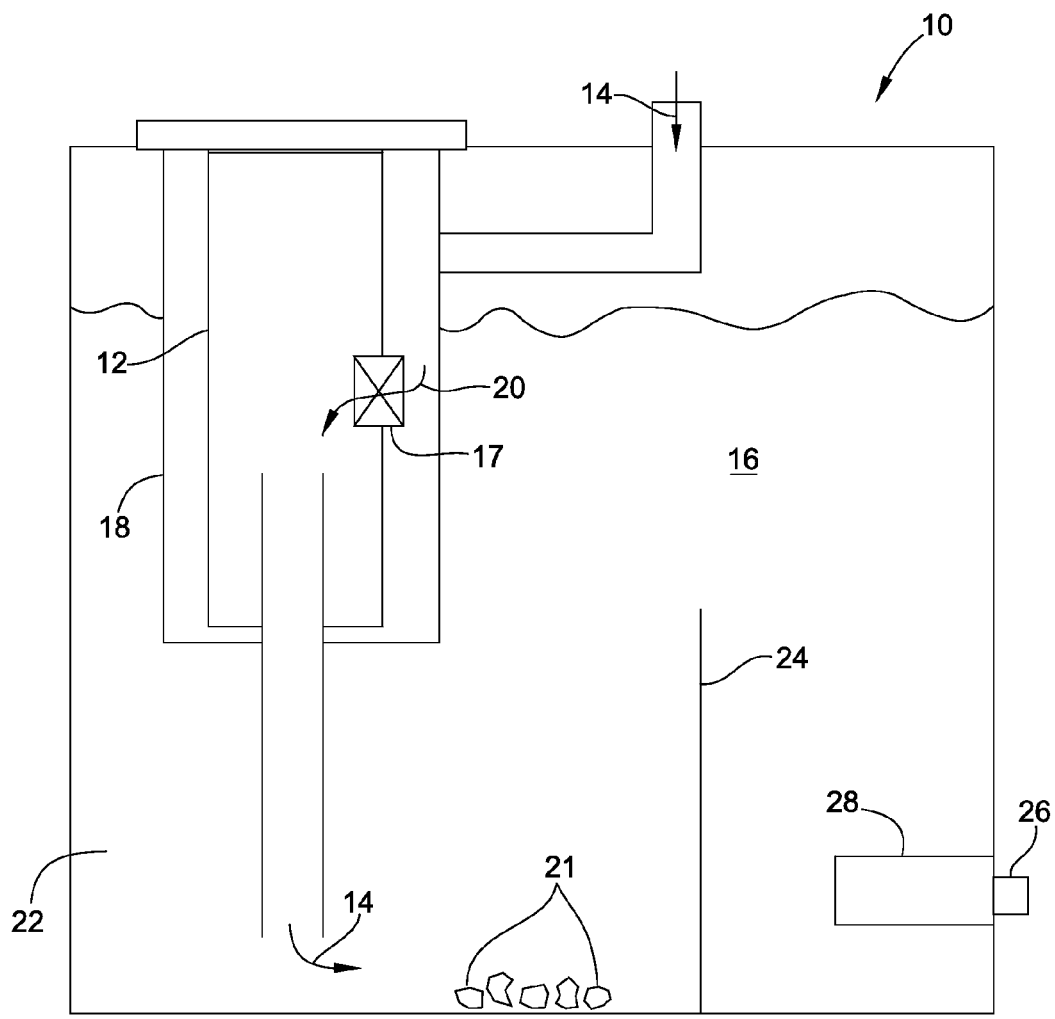
FIG. 1 is a simplified schematic representation of a hydraulic storage tank of the prior art.

The contaminant containment chamber 116 further includes a purge port 126 that includes a plug 128 that can be opened to clean the contaminant containment chamber 116. One benefit of this embodiment of the present invention is that all of the large contaminant 117 is stored within the contaminant containment chamber 116 and when the purge port 126 is opened for maintenance all of the fluid within the reservoir 104 need not be removed to clean the contaminant containment chamber 116. Instead, only the amount of fluid within reservoir 104 that is within the annular boundary wall 121 will be drained from reservoir 104. In the past, the entire tank 10 would need to be drained to remove contaminants 21 (See FIG. 1).

To maximize the amount of fluid 102 that remains in reservoir 104 when draining contaminant containment chamber 116, it is desirous to have opening 122 as close to the top 130 of the storage tank 130 as possible.

To generate the circular fluid motion within contaminant containment chamber 116, outlet 118 of the discharge passage 114 includes a louver 132 that directs fluid exiting the tube/pipe forming the discharge passage 114 angularly about central axis 120. In a preferred embodiment, the louver 132 is directly machined from the sidewall of the tube/pipe forming the discharge passage 114. Alternatively, a secondary piece can be mounted to the discharge passage 114 to effectuate angularly directing the flow of fluid out of outlet 118.

The outlet 118 of the discharge passage 114 may actually be formed from a plurality of outlets that are angularly spaced apart about axis 120, however, the plurality of outlets can be referred to in the singular for simplicity as they combine to generally form an outlet out of discharge passage 114.

By utilizing a contaminant containment chamber 116 according to the teachings of the present invention, the outlet 140 of the storage tank 100, i.e. the suction port, from which fluid stored within reservoir 104 exits tank 100 can be free of any strainers or screens. Further, the additional baffle plate is not necessary. Further, in some embodiments, the amount of material required to form the baffle plate in the prior art is more than or about equal to the amount of material required to from the contaminant containment chamber 116.

In alternative embodiment, the discharge passage 114 need not be aligned with the central axis 120 defined by opening 122 and contaminant containment cavity 116, but could extend perpendicular to the illustrated arrangement such that the discharge passage passes through boundary wall 121. In this arrangement, the flow of the fluid through the discharge passage 114 at the outlet thereof could be directly aligned with the tangent of the desired circular motion within the contaminant containment chamber 116.

Figure 3:
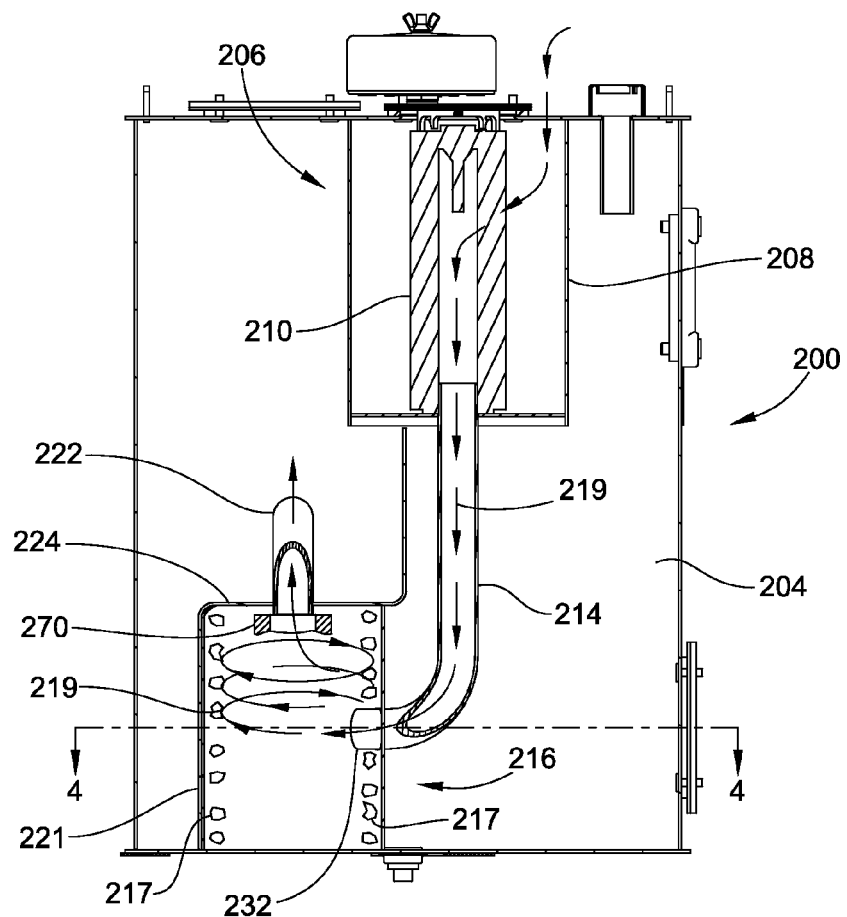
FIG. 3 is first cross-sectional illustration of a storage tank according to an embodiment of the present invention.

FIG. 3 is a cross-sectional illustration of an alternative embodiment of the a hydraulic storage tank 200 that utilizes this alternative discharge passage arrangement.

The hydraulic storage tank 200 generally includes a return flow filter assembly 206. The return flow filter assembly 206 includes a filtration chamber 208 which is generally positioned within reservoir 204 that houses filter 210.

A discharge passage 214 fluidly connects the filtration chamber 208 to contaminant containment chamber 216. The output of discharge passage 214 is dispensed into contaminant containment chamber 216. The orientation of the discharge passage 214 relative to the contaminant containment chamber 216 is such that the fluid flow, illustrated as arrow 219, swirls within contaminant containment chamber 216, as discussed previously, to cause particulates 217 entrapped in fluid flow 219 to be deposited along boundary wall 221.

Figure 4:
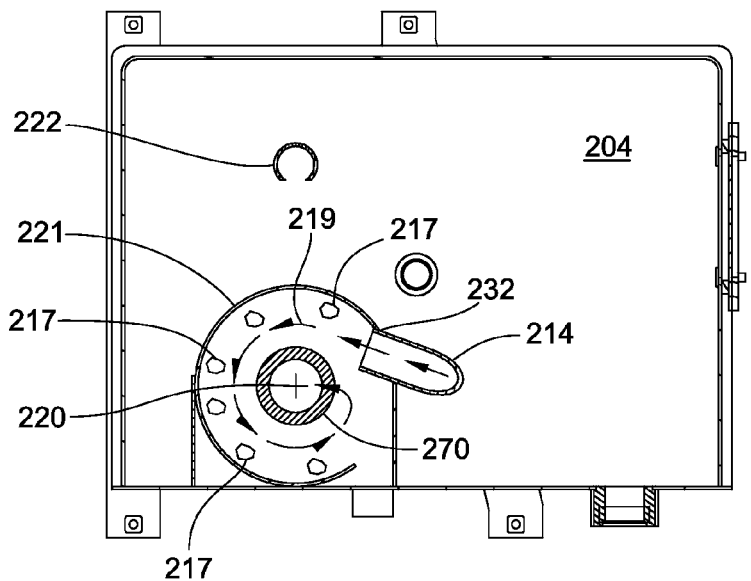
FIG. 4 is a further cross-sectional illustration of the storage tank of FIG. 3.

In this arrangement, the outlet 232 of the discharge passage passes through annular boundary wall 221 rather than down through a top wall 224 of the contaminant containment chamber 216 (see FIG. 3). As illustrated in FIG. 4, the flow path of the fluid flow 219 as it exits outlet 232 is offset from the radius of boundary wall 221. Thus, the fluid flow does not pass through the central axis 220 of the contaminant containment chamber 216. Instead, the flow path is substantially tangent to the annular boundary wall 221 such that the flow is directed in the swirling motion as illustrated in FIG. 4.

Figure 6:
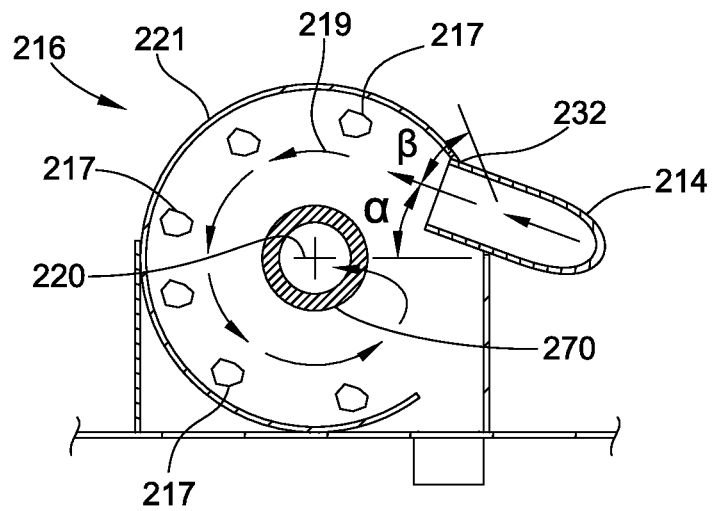
FIG. 6 is an enlarged schematic representation of the flow path of the fluid within the contaminant containment chamber of the storage tank of FIG. 3.

The outlet 232 need not be perfectly tangent, but is desired that the angle α between the radius and flow path, as illustrated in FIG. 6, is greater than 30 degrees and more preferably greater than 45 degrees and even more preferably greater than 60 degrees. The closer angle α approaches 90 degrees the better swirling action and reduced amount of deleterious turbulence that is generate in the fluid within the contaminant containment chamber 216. While angle α may be used to describe the orientation of the outlet 232 relative to the rest of the contaminant containment chamber 216, angle β may also be used. Angle β is the angle between the flow path and the tangent of the boundary wall 221. This angle is preferably between zero and sixty degrees. Using angle β can be beneficial in the event that the boundary wall 221 is not perfectly circular.

The contaminant containment chamber 216 includes an outlet 222 that is proximate the center of the contaminant containment chamber 216 defined by annular boundary wall 221. This outlet 222 allows the fluid to exit the contaminant containment chamber 216 but traps the heavier particles 217 within the contaminant containment chamber 216 because, due to the swirling action, they are prevented from reaching the center point of the chamber 216.

In one embodiment, a further filter 270 (see FIG. 3) is attached to the outlet 222. This filter 270 is typically a course filter used typically only to prevent contaminants from passing though outlet 222 during start-up of the fluid system. At this transient time, the swirling effect has not been established and may cause turbulence in the contaminant containment chamber 216 that will mix the previously separated contaminant particulates into the fluid flow such that they will pass through outlet 222. However, for systems that will remain in a constant flow position or steady state configuration without repeated startups this course startup filter may not be required.

Figure 5:
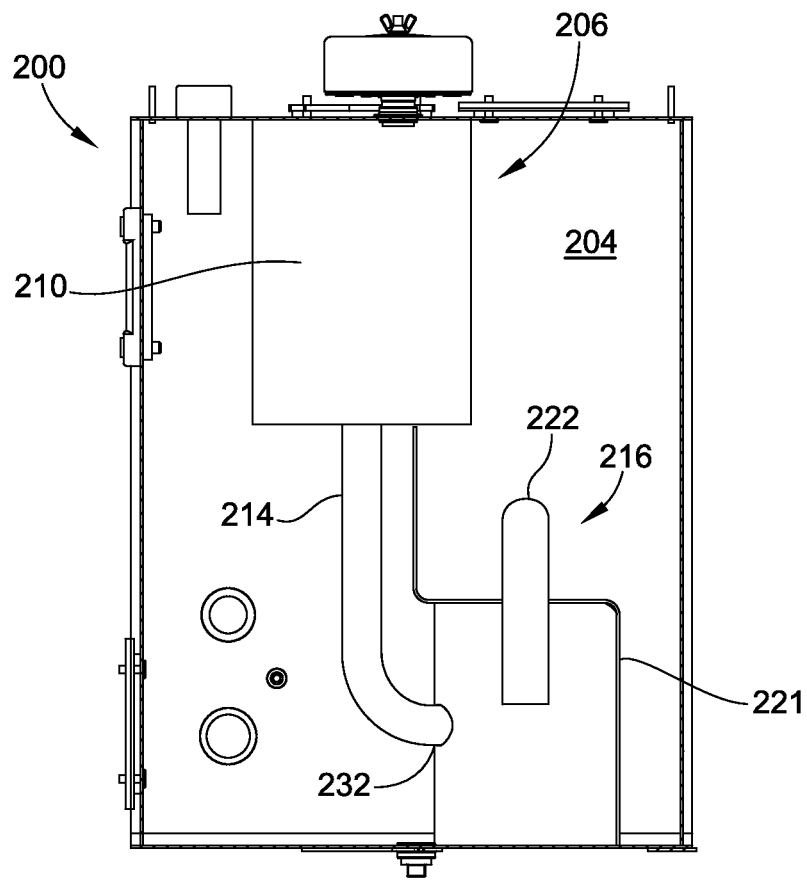
FIG. 5 is a further cross-sectional illustration of the storage tank of FIG. 3.

By not having the discharge passage pass through the center of the contaminant containment chamber 216, such as illustrated in the embodiment of FIG. 2, this arrangement is more conducive to the inclusion of a filter element 270 coupled to outlet 222. In one embodiment, outlet 222 is formed by a pipe or other conduit extending upward from top wall 224. This pipe type outlet 222 may have a U-shaped bend such that it discharges cleaned fluid in a downward direction, and typically below top wall 224 (see generally FIG. 5). This U-shaped arrangement can also work to prevent fluid from being drawn from the storage tank 200 when the contaminant containment chamber 216 is drained to remove particles 217 or to replace the filter element contained therein.

While only a single discharge passage 214 is illustrated in the embodiment of FIGS. 3-4, a pair of discharge passages 214 may be used. These passages would typically be oriented at 180 degree orientations from one another so that the fluid discharge therefrom does not interfere with one another, but promotes the swirling action in a common or coordinated angular direction.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A hydraulic storage tank system comprising:
    a storage tank defining a reservoir for storing hydraulic fluid;
    a contaminant containment chamber including a boundary wall positioned within the storage tank radially bounding a cavity of the contaminant containment chamber and a contaminant containment chamber outlet fluidly communicating the cavity with a portion of the reservoir surrounding the contaminant containment chamber, the contaminant containment chamber outlet being radially inward from the boundary wall;
    a tube defining a discharge passage operably fluidly connecting the cavity of the contaminant containment chamber with a supply of return fluid; the tube including an outlet dispensing return fluid into the contaminant containment chamber; and
    wherein the outlet of the tube directs the return fluid in an angular direction about and radially spaced outward from a central axis defined by the contaminant containment chamber outlet, the outlet of the tube being positioned vertically below the contaminant containment chamber outlet such that the return fluid flows vertically upward from the outlet of the tube to the contaminant containment chamber outlet.

2. The hydraulic storage tank system of claim 1, wherein the tube passes axially through the contaminant containment chamber outlet along the axis.

3. The hydraulic storage tank system of claim 2, wherein the boundary wall is an annular wall, and the contaminant containment chamber further includes a top wall that caps an end of the boundary wall, except for the contaminant containment chamber outlet, the contaminant containment chamber outlet is formed by the top wall.

4. The hydraulic storage tank system of claim 3, wherein the outlet of the tube is formed in a sidewall of the tube and an end of the tube within the cavity of the contaminant containment chamber is closed forcing fluid to exit through the sidewall of the tube through the outlet in a non-radially directed angular direction about the central axis.

5. The hydraulic storage tank system of claim 4, wherein the outlet through the sidewall of the tube includes a louver for directing fluid angularly relative to the central axis.

6. The hydraulic storage tank system of claim 5, wherein the outlet through the sidewall of the tube is formed by a plurality of angularly spaced apertures formed in the sidewall of the tube; each aperture including a corresponding louver for directing fluid in the same angular direction about the central axis of the boundary wall.

7. The hydraulic storage tank system of claim 6, wherein the tube has an outer diameter that is less than a diameter of the aperture forming the contaminant containment chamber outlet.

8. The hydraulic storage tank system of claim 1, wherein the tube passes through the boundary wall and is not co-axial with the contaminant containment chamber outlet.

9. The hydraulic storage tank system of claim 8, wherein the outlet of the discharge passage being directed at an angle of between 30 degrees and 90 degrees relative to a radius of the portion of the boundary wall through which the tube passes.

10. The hydraulic storage tank system of claim 9, wherein the contaminant containment chamber outlet is formed by an outlet pipe extending along the central axis vertically above the boundary wall and connected to a top wall of the contaminant containment chamber.

11. The hydraulic storage tank system of claim 10, wherein the pipe has a bend such that the outlet pipe is configured to dispense fluid into the reservoir in a direction opposite the direction the fluid exits the contaminant containment chamber.

12. The hydraulic storage tank system of claim 8, further comprising a return flow filtration chamber housing a return flow filter; the tube fluidly connecting the return flow filtration chamber with the cavity of the contaminant containment chamber, such that the return fluid passes through the return flow filtration chamber prior to passing through the tube; the tube including an outlet in fluid communication with the contaminant containment chamber and an inlet in fluid communication with the return flow filtration chamber; the return flow filtration chamber including an inlet port, the inlet port of the return flow filtration chamber being separated from the inlet of the tube by the filter.

13. The hydraulic storage tank system of claim 12, further including a bypass valve for permitting fluid to bypass the filter when the filter becomes sufficiently plugged.

14. The hydraulic storage tank system of claim 13, wherein the return flow filtration chamber and the contaminant containment chamber are positioned within the storage tank.

15. The hydraulic storage tank system of claim 8, further including a purge port communicating the cavity of the contaminant containment chamber with the ambient surrounding the storage tank; and further including a suction port through which fluid within the reservoir exits the storage tank, the suction port is free of any filtration or strainers proximate the suction port.

16. The hydraulic storage tank system of claim 15, further comprising a pump operably coupled to the storage tank for circulating fluid through the system from the storage tank through the suction port and back into the storage tank.

17. The hydraulic storage tank system of claim 1, further comprising a filter positioned between the outlet of the tube and contaminant containment chamber outlet, wherein the return fluid flows in the angular direction about the central axis in a cavity formed radially outward from the filter and radially inward of the boundary wall prior to passing through the filter and then flows through the filter before it passes through contaminant containment chamber outlet.

18. The hydraulic storage tank system of claim 1, wherein return fluid only exits the contaminant containment chamber through the contaminant containment fluid outlet during normal operation.

19. The hydraulic storage tank of claim 1, wherein the boundary wall is imperforate such that the return fluid cannot exit the cavity of the contaminant containment chamber except through the contaminant containment chamber outlet, wherein the contaminant containment chamber outlet is positioned axially within a portion of the boundary wall that has a circular cross-section and assists angularly directing the flow of fluid.

20. The hydraulic storage tank of claim 1, wherein the boundary wall extends axially between a bottom wall and a top wall that are generally parallel to one another, the contaminant containment chamber outlet extending through the top wall, the boundary wall being substantially cylindrical and having substantially a constant radius from the top wall to the bottom wall.

* * * * *